Patented May 22, 1934

1,959,927

UNITED STATES PATENT OFFICE

1,959,927

PRODUCTION OF VINYL ETHERS

Walter Reppe, Ludwigshafen-on-the-Rhine, Germany, assignor to I. G. Farbenindustrie Aktiengesellschaft, Frankfort - on - the - Main, Germany No Drawing. Application October 27, 1931, Serial No. 571,464. In Germany October 30, 1930

23 Claims. (Cl. 260—127)

The present invention relates to the production of vinyl ethers.

Alkyl ethers of vinyl alcohol and its homologues may be obtained (according to the German Patent No. 338,281) by causing hydrocarbons of the acetylene series, preferably in the presence of mercury compounds, to act at temperatures below zero centigrade and under increased pressure on concentrated sulphuric acid, the vinyl sulphuric acid thus obtained being brought into reaction with alcohols. A direct formation of vinyl ethers by the addition of acetylene and its homologues onto alcohols has been suggested in the British Patent No. 231,841, but the yields are not very satisfactory. Under a great variety of conditions ethers of ethylidene glycol (acetals) are always obtained, as for example when employing mercury salts when working in the liquid phase according to British Patent No. 14,246 A. D. 1913 or when working in the gaseous phase, if desired in the presence of metals or their oxides or salts according to the German Patent No. 403,784. More recently, in the preparation of acetals from acetylene and mono- or polyhydric alcohols, the use as catalysts of solutions of boron fluoride and of silicon fluoride in aliphatic alcohols to which mercury oxide has been added has been recommended (see Chem. Centralblatt 1930, I.2870; II, 1687).

I have now found that contrary to expectation, vinyl ethers are obtained in almost quantitative yields by causing acetylene to act at temperatures between about 80° and about 250° C., preferably between about 120° and 180° C., on liquefied organic, monomeric (non-polymerized) hydroxy compounds corresponding to the formula

in which X represents either —H, —COOH, —COO—metal, —NY$_2$, —(OR)$_n$—OH or —(OR)$_n$—OR groups, R being an aliphatic, hydroaromatic, or aromatic radicle, preferably hydrocarbon radicle, or an aralkyl radicle, Y being —H, —R or —ROH and n being nought or any integral number, in a strongly alkaline medium, i. e. in the presence of alkaline agents in the form of, or capable of forming with alcohols and phenols, alcoholates and phenolates.

The said compounds should not contain alkali-sensitive groups, i. e. easily exchangeable halogen groups, ketone, aldehyde and nitro groups which might react with the alkali in an undesired manner.

Alkaline agents of the said nature are alkali metal oxides, hydroxides and cyanides as for example those of sodium, potassium, lithium, rubidium and cesium, and the alcoholates, phenolates and naphtholates of the alkali metals. The corresponding alkaline earth metal compounds might be employed but in most cases they are not sufficiently active for working on a commercial scale. The said strongly alkaline substances may also be incorporated with mercury compounds, such as mercury oxide, sulphate or phosphate, but the co-employment of the latter leads to a slight acceleration of the reaction only and is therefore generally dispensed with. Since the reaction is to be carried out in a strongly alkaline medium, the quantity of alkali must be so chosen that, in the case of working with hydroxy carboxylic acids, it is slightly in excess of that required for a neutralization of the acid groups present in the initial material. The quantity of strongly alkaline agent employed is generally at least 0.2 per cent by weight of the hydroxyl compound to be brought into reaction, from 0.5 to about 10 per cent being usually employed, though higher quantities, such as 12, 15 or even 20 per cent may be employed. If desired, the quantity of strongly alkaline agent chosen may be gradually added to the reaction mixture.

The organic hydroxy compounds may be chosen from mono- and polyhydric aliphatic and cyclic, i. e. hydroaromatic and araliphatic, alcohols, from phenols, naphthols, hydroxy-carboxylic acids, or metal salts thereof respectively, and partially etherified polyhydric alcohols, partially esterified polyhydric alcohols reacting like mixtures of alcohols and acids owing to a saponification by the alkali present. Specific compounds of these types are, for example, alcohols, such as methanol, ethanol, n- and iso-propanol, butanols, hexanols, octanol, decanol, dodecanol, tetra- and octodecanols, docosanol, montanol (the mixture of alcohols resulting in reducing the mixture of acids of Montan wax), the saturated and unsaturated alcohols, or mixtures thereof obtainable by the reduction of acids of vegetal, i. e. animal or vegetable, origin as for example from dodecanol to octodecanol and octodecandiol, and ethylene-, propylene-, 1.3-butylene-, diethylene and triethylene glycols, glycerol and pentaerythritol and their mono-alkyl and aryl ethers such as their mono-methyl, -ethyl, -butyl and -phenyl ethers and the corresponding di-alkyl ethers of glycerol, hydroxy-carboxylic acids, or their salts respectively, such as alkali metal glycolates aminoalcohols, as for example mono-, di- or tri-alkylol amines, such as mono-, di- or tri-ethanol- or -propanol-amines or mono-alkyl mono- or di-ethanol amines, such as N-methyl, or N-cyclohexyl, -N-di-ethanol amines, and hydroxy compounds containing aromatic nuclei, such as phenol, cresol, benzyl alcohol, 1-phenyl-3-propanol and α- and β-naphthols.

The reaction temperatures are usually between about 80° and about 250° C., the specific temperatures preferred depending mainly on the nature of the initial materials, hydroxy compounds of high molecular weight requiring generally higher temperatures than those of a lower molecular weight. In case the boiling point of the hydroxy compound employed is the same as, or higher than, the reaction temperature, the conversion may be carried out at atmospheric pressure, i. e. the current of acetylene is led through the reaction mixture in an open vessel, but increased pressure must be employed when the boiling point of the hydroxy compound is below the reaction temperature; the pressure employed in this case depends on the boiling point of the hydroxy compound. Thus, for example, in the case of working with ethyl alcohol in a continuous manner as will be more fully explained below, the reaction temperature being about 160° C., the pressure of the alcohol vapor is about 12 atmospheres and the partial pressure of acetylene will be chosen from about 1.5 to 2 atmospheres, the total pressure being between about 13 and 14 atmospheres. The danger of explosions may be avoided by diluting the acetylene with inert gases, as for example nitrogen, methane, ethane, hydrogen or mixtures of these; even when greatly diluted, the acetylene can be brought into reaction with the hydroxy compounds. Another method for preventing explosions consists in working in a continuous manner in narrow pipes consisting of materials having a good heat-conductivity. Since the limit for explosions on working with acetylene and its homologues at the different pressures and temperatures is well known in the art I need not go into details about it and may define the process according to the present invention as carried out with nonexplosive mixtures of hydrocarbons of the acetylene series and hydroxy compounds.

In the preparation of mono-vinyl ethers of polyhydric alcohols, especially those having adjacent hydroxyl groups, the working temperature should not appreciably exceed the actual reaction temperature, i. e. the temperature at which the reaction starts, which effect is easily ascertained by the consumption of the acetylene hydrocarbon, because otherwise the vinyl groups first formed readily react with the adjacent hydroxyl groups with the formation of cyclic acetals. For example in the case of ethylene glycol it is advantageous to work at 120° C., whereby the conversion of the ethylene glycol mono-vinyl ether first formed into ethylene ethylidene ether is almost entirely precluded, whereas at 180° C. the last-mentioned ether is almost exclusively formed according to the equation:

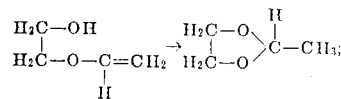

a temperature between 80° and 110° C. may also be chosen, but the reaction proceeds more quickly at about 120° C.

The preparation of the ethers may be readily carried out on an industrial scale either discontinuously or continuously. In the latter case, the organic hydroxy compound to be acted upon can be continuously supplied for example by means of a pressure pump to a pressure-tight tower, capable of being heated and preferably provided with filler bodies, while at the same time, preferably in counter-current, a mixture of acetylene and nitrogen is led in circulation through the tower by means of another pressure pump. The acetylene used up in the reaction is continuously replenished and a part of the circulating mixture of acetylene and nitrogen is continuously withdrawn, in order to counteract the enrichment of foreign gases by reason of the supply of commercial acetylene which is not 100 per cent in strength. The reaction product is continuously withdrawn at the end of the tower opposite to the inlet, fractionally distilled and the unconverted fraction returned to the tower. By the known catalytic hydrogenation of the vinyl ethers in the liquid phase, preferably in the presence of solvents, such as methanol or ethanol, or in the gaseous phase with the usual hydrogenating catalysts, the saturated ethers may be obtained. Thus, for example, ethylene glycol diethyl ether, which hitherto could only be obtained in a troublesome manner by way of the sodium compound of ethylene glycol mono-ethyl ether by means of diethyl sulphate or an ethyl halide, is readily obtained from ethylene glycol mono-ethyl ether by way of the ethylene glycol ethyl vinyl ether.

The following examples will further illustrate how this invention may be carried out in practice but the invention is not restricted to these examples. The parts are by weight.

*Example 1*

A mixture of nitrogen and acetylene in the proportions of 1:2 by volume is pressed into a stirring autoclave containing a solution of 5 parts of sodium in 1000 parts of anhydrous ethyl alcohol until the pressure is about 15 atmospheres. The autoclave is heated to 150° C. whereby the pressure rises at first to about 30 atmospheres. The reduction in the pressure caused by the reaction is equalized from time to time by pressing in a gaseous mixture rich in acetylene. When the calculated amount of acetylene has been absorbed (after about 15 hours) the whole is allowed to cool. By fractional distillation of the reaction product pure ethyl vinyl ether having a boiling point of 36° C. is obtained in a yield of more than 95 per cent of the theoretical yield. The same result is obtained when the equivalent amount of commercial 94 per cent ethyl alcohol is employed instead of the anhydrous ethyl alcohol and when the equivalent amount of caustic potash is employed instead of metallic sodium.

*Example 2*

A mixture of nitrogen and acetylene in the ratio of 1 : 2 by volume is pressed into a stirring autoclave containing a solution of 10 parts of solid potassium hydroxide in 1000 parts of n-pheres and the atuoclave is then heated to 150° C. The pressure is kept at from 14 to 20 atmosbutanol until the pressure is about 15 atmospheres by the periodic addition of a gaseous mixture rich in acetylene until the calculated amount of acetylene has been absorbed, which is the case after about 16 hours. When the reaction product is worked up by fractional distillation, vinyl n-butyl ether is obtained in a yield of 95 per cent of the theoretical yield. If n-amyl alcohol be employed in the place of the butanol, vinyl n-amyl ether having a boiling point of 111° C. at normal pressure is obtained.

Example 3

A solution of 5 parts of solid potassium hydroxide in 1000 parts of cyclohexanol is treated with a mixture of acetylene and nitrogen according to Example 1 at 150° C. under a pressure of between 12 and 20 atmospheres. The yield of vinyl cyclohexyl ether amounts to about 80 per cent of the theoretical yield.

Example 4

5 parts of caustic potash are dissolved in 1000 parts of ethylene glycol mono-ethyl ether. The solution is treated at 20 to 30 atmospheres pressure and at 150° C. for about 24 hours with a mixture of acetylene and nitrogen as described in Example 1. By fractional distillation of the reaction product which, depending on the amount of acetylene absorbed, contains large or small amounts of unchanged ethylene glycol mono-ethyl ether, ethylene glycol ethyl vinyl ether having a boiling point of 126° C. is obtained in a yield of more than 90 per cent of the theoretical yield.

By hydrogenating the ethylene glycol ethyl vinyl ether by means of a nickel catalyst in the gaseous or liquid phase, in which latter case it is preferable to add a solvent, such as alcohols, ethylene glycol diethyl ether may be obtained in excellent yields.

Example 5

5 parts of caustic potash are dissolved in 1000 parts of ethylene glycol. The solution is treated at 120° C. with a mixture of acetylene and nitrogen as described in Example 1 until the absorption of acetylene only proceeds slowly, which is the case after 36 hours. By working up the reaction mixture by fractional distillation:

33 per cent of ethylene glycol mono-vinyl ether,
10 per cent of ethylene glycol divinyl ether,
4 per cent of ethylene ethylidene ether (cyclic acetal) and
50 per cent of unchanged glycol are obtained, the percentages being percentages of the theoretical yield calculated on the glycol employed.

At higher temperatures, the amount of ethylene ethylidene ether increases considerably by reason of the conversion of the ethylene glycol mono-vinyl ether first formed. At 180° C. ethylene ethylidene ether is the main product.

The caustic potash may be replaced by an equal amount of potassium cyanide whereby the same results are obtained.

Example 6

470 parts of phenol and 50 parts of sodium phenolate are dissolved in 1000 parts of methanol. The solution is treated at 180° C. and at from 40 to 50 atmospheres with a mixture of acetylene and nitrogen according to Example 1, until the amount of acetylene corresponding to the phenol employed has been absorbed, which is the case after about 20 hours. After distilling off the methanol and small amounts of methyl vinyl ether, a vinyl phenyl ether containing small amounts of phenol is obtained by fractional distillation and may be isolated by shaking with caustic soda, drying and refractionating in a pure form in a yield of over 90 per cent of the phenol consumed or of about 80 per cent of the phenol employed. The boiling point of the vinyl phenyl ether is 155° to 156° C.

When employing the equivalent amount of meta-cresol and of sodium meta-cresolate, vinyl meta-cresyl ether is obtained in a yield of about 85 per cent of the theoretical yield in an analogous manner.

Example 7

720 parts of beta-naphthol and 14 parts of caustic potash are dissolved in 1000 parts of methanol and treated for 24 hours with a mixture of acetylene and nitrogen as described in Example 6. The residue which remains behind after distilling off the methanol and small amounts of methyl vinyl ether is treated with 25 per cent caustic potash solution until the unconverted beta-naphthol is neutralized, subjected to extraction with ethyl ether and the ether and the ethereal solution dried with calcium chloride. Vinyl-beta-naphthyl ether having a melting point of 33° C. and a boiling point of 264° C. is obtained in a yield of from 70 to 80 per cent of the theoretical yield after distilling off the ethyl ether.

If the beta-naphthol be replaced by an equal quantity of beta-tetrahydronaphthol, the vinyl beta-tetrahydronaphthol ether having a boiling point of 143° C. at 18 millimetres of mercury is obtained.

Example 8

A solution of 25 parts of caustic potash in 800 parts of n-propanol is treated at 150° C. with a mixture of acetylene and nitrogen as described in Example 1 at a pressure of from 15 to 20 atmospheres, until no more acetylene is absorbed. By fractional distillation of the reaction mixture about 90 per cent of the theoretically obtainable amount of vinyl n-proply ether boiling at 64° C. are obtained.

By employing 800 parts of isopropanol instead of n-propanol, vinyl isopropyl ether boiling at from 54° to 56° C. is obtained in a yield of about 70 per cent of the theoretical yield.

If 800 parts of n-amyl alcohol be employed, vinyl n-amyl ether boiling at 111° is obtained in a yield of 90 per cent of the theoretical yield.

Example 9

A mixture of acetylene and nitrogen in the proportions of 2 : 1 by volume is pressed into a stirring autoclave heated to 120° C. and containing a solution of 40 parts of caustic potash in 1200 parts of methanol, until about ⅓ of the theoretical amount of acetylene is absorbed. The autoclave is then cooled to 40° C. and the bulk of the vinyl methyl ether formed is distilled through a dephlegmator. The autoclave is then heated again to 120° C. and the treatment of the alcoholic solution with the gaseous mixture is repeated until another third of acetylene is absorbed, the further operations being then repeated as described. By reuniting the vinyl methyl ether obtained in the three runs a practically quantitative yield is obtained, the ether boiling at 9° C.

Example 10

A mixture of acetylene and nitrogen in the proportions of 2 : 1 by volume is pressed at 150° C. into a stirring autoclave containing a solution of 30 parts of caustic potash in 950 parts of the mono-ethyl ether of di-ethylene glycol $$(C_2H_5-O-C_2H_4-O-C_2H_4-OH)$$

at a pressure of about 10 to 15 atmospheres until no more acetylene is absorbed. The reaction mixture is fractionated in vacuo: a practically quantitative yield of diethylene glycol vinyl ethyl ether $(C_2H_5-O-C_2H_4-O-C_2H_4-O-CH=CH_2)$, boiling between 90° and 97° C. at 20 millimetres mercury, is thus obtained.

By employing the same quantity of triethylene glycol mono-ethyl ether instead of the diethylene glycol mono-ethyl ether an excellent yield of triethylene glycol vinyl ethyl ether, boiling between 100 and 125° C. at 10 millimetres of mercury, is obtained.

Poly-ethylene glycols which may contain from 10 to 20 ethylene oxide radicles, may be converted into the corresponding poly-ethylene glycol vinyl ethyl ethers in a similar way.

Example 11

A mixture of acetylene and nitrogen in the proportions of 2:1 by volume is pressed at 150° C. into a stirring autoclave containing 940 parts of octodecanol and 30 parts of caustic potash at a pressure of from 10 to 15 atmospheres until no more acetylene is absorbed, i. e. during about 4 hours. By fractionating the reaction mixture in vacuo vinyl octodecyl ether, boiling at 190° C. at 10 millimetres mercury gauge, is obtained in an approximately quantitative yield.

By hydrogenating the vinyl octodecyl ether thus obtained by means of hydrogen in the presence of a nickel catalyst and of methanol as solvent a quantitative amount of ethyl octodecyl ether, boiling at 190° C. at 10 millimetres of mercury is obtained.

If octanol be employed in the place of octodecanol the vinyl octyl ether having a boiling point of 75° C. at 5 millimetres of mercury, is obtained, the vinyl decyl ether, obtainable in the same way from decanol, having a boiling point of 110° C. at 4 millimetres of mercury and the vinyl dodecyl ether, obtainable from dodecyl alcohol, having a boiling point of 120° C. at 4 millimetres of mercury.

Example 12

A mixture of acetylene and nitrogen in the proportions of 2:1 by volume is pressed at 150° C. at a pressure between 15 and 20 atmospheres into a stirring autoclave containing a solution of 1050 parts of diethanol amine and 30 parts of caustic potash in 800 parts of n-butanol, until 260 parts of acetylene are absorbed. The reaction mixture is subjected to fractional distillation; the mono-vinyl ether of diethanol amine $(HO-C_2H_4-NH-C_2H_4-O-CH=CH_2)$, boiling between 100° and 110° C. at 8 millimetres of mercury is thus obtained in a satisfactory yield.

Example 13

A solution of 1490 parts of triethanol amine and 45 parts of caustic potash in 1200 parts of n-butanol is treated according to Example 12 with a mixture of acetylene and nitrogen until 520 parts of acetylene are absorbed. A satisfactory yield of triethanol amine di-vinyl ether $(HO-C_2H_4-N=(C_2H_4-O-CH=CH_2)_2)$, boiling at from 120° to 130° C. at 8 millimetres of mercury, is obtained.

Example 14

A mixture of equal parts by volume of acetylene and nitrogen is circulated at a temperature between 150° and 160° C. and at a pressure of 4 atmospheres through a system comprising a pressure-tight column, a refrigerator, a stripping vessel, a pressure circulating pump and a compressor for the acetylene; the gaseous mixture first passes the column filled with Raschig rings and containing a solution of about 10 per cent of caustic potash in n-butanol, then the refrigerator and the stripping vessel, whereupon it is passed again into the column by means of the pump. The vinyl n-butyl ether formed is carried off from the column together with the unaltered n-butanol by the circulating gas mixture; it is condensed in the refrigerator and separated from the gas mixture in the stripping vessel. The consumed proportion of acetylene is continuously replaced by a fresh, nearly 100 per cent acetylene mixture by means of the acetylene compressor which is intercalated between the circulating pump and the column. A corresponding amount of the circulating gases is released after passing the stripping vessel in order to maintain the content of acetylene in the mixture at from 50 to 60 per cent, thus avoiding an enrichment of the gaseous mixture in other gases contained in the fresh acetylene. A quantity of butanol containing 3 per cent of caustic potash corresponding to the consumed proportion of butanol is continuously pumped in at the top of the column. A small amount of the caustic potash solution is removed continuously, or from time to time, from the bottom of the column in order to prevent any accumulation of consumed caustic potash in the column. The mixture of vinyl n-butyl ether and butanol condensed in the stripping vessel is continuously removed therefrom, and the acetylene dissolved in the said mixture is released and passed to the acetylene compressor, whilst the mixture of vinyl ether and butanol is continuously distilled, if desired, in conjunction with the liquid removed from the bottom of the column. About 10 per cent of the volume of the tower of vinyl butyl ether can be thus obtained per hour.

Instead of vinyl butyl ether, vinyl ethyl ether can be obtained if ethanol be employed instead of butanol, the pressure and temperature being preferably about 15 atmospheres and from 150° to 160° C. in this case.

In both cases the yield of vinyl ether is more than 90 per cent of the theoretical amount.

Example 15

Fused octodecanol containing 2 per cent its weight of caustic potash is passed into the top of a tower filled with Raschig rings and capable of being heated and cooled. Acetylene is blown through the tower at a temperature between 170° and 175° C. The acetylene enters the tower at the bottom and remainders thereof leave it at the top; the gaseous mixture formed then passes a stripper where octodecanol and octodecyl vinyl ether carried along by the gas are separated, the acetylene being sucked off and returned into the tower and the main quantities of ether being drawn off at the bottom of the tower. The quantity of acetylene circulating within one minute through the system approximately corresponds to the inner space of the tower. The proportion of acetylene consumed is automatically replaced by fresh acetylene from a gas tank. A small amount of acetylene is continuously removed after passing the stripper in order to avoid in the circulating gas any enrichment in other gases contained in the fresh acetylene. Fresh octodecanol containing 2 per cent of caustic potash is continuously introduced at the top of the tower, whilst the reaction product, consisting of a concentrated solution of vinyl octodecyl ether, is continuously removed from the bottom. The quantity of fresh octodecanol introduced is equivalent to the amount of ether produced by the highly exothermic reaction which may even render cooling necessary. Usually an amount of butanol corresponding to about ¼ the inner space of the tower can be put through within one hour. The crude octodecyl vinyl ether is distilled in vacuo, about 90 per cent of the theoretical yield of 100 per cent ether being thus obtained. The vinyl octodecyl ether boils between 179° and 180° C. at 3 millimetres of mercury.

By replacing octodecanol by tetradecanol, vinyl-tetradecyl ether, having a boiling point of from 140° to 145° C. at 4 millimetres of mercury, is obtained, and vinyl cetyl ether, having a boiling point of from 160° to 165° C. at 4 millimetres of mercury, from cetyl alcohol, which can be obtained by a saponification of sperm oil. Similarly vinyl oleyl ether, having a boiling point of from 170° to 175° C. at 2 millimetres of mercury can be obtained from oleyl alcohol obtainable by reducing oleic methyl esters with the aid of metallic sodium.

Alcohols of a molecular weight still higher than that of octodecanol, for example montanol, obtainable by a catalytic reduction of the acids of crude or bleached Montan wax, can be converted into the corresponding vinyl ethers in a similar way.

In the same way di-ethylene glycol di-vinyl ether ($CH_2=CH-O-C_2H_4-O-C_2H_4-O-CH=CH_2$), having a boiling point of from 100° to 110° C. at 18 millimetres of mercury, can be obtained from di-ethylene glycol, the tri-ethylene glycol di-vinyl ether, having a boiling point of from 120° to 126° C. at 18 millimetres of mercury being obtained from tri-ethylene glycol.

What I claim is:

1. In the catalytic production of vinyl ethers from non-explosive mixtures of hydrocarbons of the acetylene series and alcohols, the step which comprises acting with acetylene at a temperature between about 80° and about 250° C. in a strongly alkaline medium on a liquefied organic, monomeric hydroxy compound free from alkali-sensitive groups and corresponding to the formula $$R \diagup^{X}_{OH},$$

in which X represents either —H, —COOH, —COO—metal, —NY$_2$, —(OR)$_n$—OH or —(OR)$_n$—OR groups, R being an aliphatic, hydroaromatic, aromatic or aralkyl radicle, Y being —H, —R or —ROH and n being nought or any integral number.

2. In the catalytic production of vinyl ethers from non-explosive mixtures of hydrocarbons of the acetylene series and alcohols, the step which comprises acting with acetylene at a temperature between about 80° and about 250° C., on a liquefied organic, monomeric hydroxy compound free from alkali-sensitive groups and corresponding to the formula $$R \diagup^{X}_{OH},$$

in which X represents either —H, —COOH, —COO—metal, —NY$_2$, —(OR)$_n$—OH or —(OR)$_n$—OR groups, R being an aliphatic, hydroaromatic, aromatic or aralkyl radicle, Y being —H, —R or —ROH and n being nought or any integral number, sufficient alkali metal hydroxide being added to produce a strongly alkaline reaction in the reaction medium.

3. In the catalytic production of vinyl ethers from non-explosive mixtures of hydrocarbons of the acetylene series and alcohols, the step which comprises acting with acetylene at a temperature between about 80° and about 250° C., on a liquefied organic monomeric hydroxy compound free from alkali-sensitive groups and corresponding to the formula $$R \diagup^{X}_{OH},$$

in which X represents either —H, —COOH, —COO—metal, —NY$_2$, —(OR)$_n$—OH or —(OR)$_n$—OR groups, R being an aliphatic, hydroaromatic, aromatic or aralkyl radicle, Y being —H, —R or —ROH and n being nought or any integral number, sufficient alkali metal alcoholate being added to produce a strongly alkaline reaction in the reaction medium.

4. In the catalytic production of vinyl ethers from non-explosive mixtures of hydrocarbons of the acetylene series and alcohols, the step which comprises acting with acetylene, at a temperature between about 80° and about 250° C. and at superatmospheric pressure in a strongly alkaline medium on a liquefield organic nonomeric hydroxy compound free from alkali-sensitive groups and corresponding to the formula $$R \diagup^{X}_{OH},$$

in which X represents either —H, —COOH, —COO—metal, —NY$_2$, —(OR)$_n$—OH or —(OR)$_n$—OR groups, R being an aliphatic, hydro-aromatic, aromatic or aralkyl radicle, Y being —H, —R or —ROH and n being nought or any integral number.

5. In the catalytic production of vinyl ethers from non-explosive mixtures of hydrocarbons of the acetylene series and alcohols, the step which comprises acting with acetylene, at a temperature between about 80° and 250° C. in a strongly alkaline medium on a liquefied organic monomeric hydroxy compound free from alkali-sensitive groups and corresponding to the formula $$R \diagup^{X}_{OH},$$

in which X represents either —H, —COOH, —COO—metal, —NY$_2$, —(OR)$_n$—OH or —(OR)$_n$—OR groups, R being an aliphatic, hydroaromatic or aromatic hydrocarbon radicle, or an aralkyl radicle, Y being —H, —R or —ROH and n being nought or any integral number.

6. In the catalytic production of vinyl ethers from non-explosive mixtures of hydrocarbons of the acetylene series and alcohols, the step which comprises acting with acetylene, at a temperature between about 120° and about 180° C., on a liquefied organic monomeric hydroxy compound free from alkali-sensitive groups and corresponding to the formula $$R \diagup^{X}_{OH},$$

in which X represents either —H, —COOH, —COO—metal, —NY$_2$, —(OR)$_n$—OH or —(OR)$_n$—OR groups, R being an aliphatic, hydroaromatic, or aromatic hydrocarbon radicle, or an aralkyl radicle, Y being —H, —R or —ROH and n being nought or any integral number, sufficient alkali metal alcoholate being added to produce a strongly alkaline reaction in the reaction medium.

7. In the catalytic production of vinyl ethers from non-explosive mixtures of hydrocarbons of the acetylene series and alcohols, the step which comprises acting with acetylene at temperatures between about 80° and about 250° C. on a liquefied alcohol free from alkali-sensitive groups in a strongly alkaline medium.

8. In the catalytic production of vinyl ethers from non-explosive mixtures of hydrocarbons of the acetylene series and alcohols, the step which comprises acting with acetylene, at a temperature between about 80° and about 250° C. on a liquefied aliphatic alcohol free from alkali-sensitive groups in the presence of an alkali metal alcoholate.

9. In the catalytic production of vinyl ethers from non-explosive mixtures of hydrocarbons of the acetylene series and alcohols, the step which comprises acting with acetylene, at a temperature between about 80° and about 250° C. on a liquefied aliphatic alcohol free from alkali-sensitive groups and containing more than 5 carbon atoms in the presence of an alkali metal alcoholate.

10. In the catalytic production of vinyl ethers from non-explosive mixtures of hydrocarbons of the acetylene series and alcohols, the step which comprises acting with acetylene, at a temperature between about 80° and about 250° C. on a liquefied aliphatic alcohol containing an amino group, in the presence of an alkali metal alcoholate.

11. In the catalytic production of vinyl ethers from non-explosive mixtures of hydrocarbons of the acetylene series and alcohols, the step which comprises acting with acetylene, at a superatmospheric pressure and a temperature between about 120° and about 180° C., on an aliphatic alcohol free from alkali-sensitive groups in the presence of an alkali metal alcoholate.

12. In the catalytic production of vinyl ethers from non-explosive mixtures of hydrocarbons of the acetylene series and alcohols, the step which comprises acting with acetylene at a temperature between about 80° and about 250° C. on a liquefied, polyhydric aliphatic alcohol free from alkali-sensitive groups in the presence of an alkali metal alcoholate.

13. In the catalytic production of vinyl ethers from non-explosive mixtures of hydrocarbons of the acetylene series and alcohols, the step which comprises acting with acetylene, at a temperature between about 80° and about 250° C. on a liquefied, polyhydric aliphatic alcohol containing ether groups, in the presence of an alkali metal alcoholate.

14. In the catalytic production of vinyl ethers from non-explosive mixtures of hydrocarbons of the acetylene series and alcohols, the step which comprises acting in a closed vessel with acetylene at a temperature between about 120° and about 180° C., on a liquid glycol free from alkali-sensitive groups in the presence of an alkali metal alcoholate.

15. In the catalytic production of vinyl ethers from non-explosive mixtures of hydrocarbons of the acetylene series and alcohols, the step which comprises acting with acetylene, at temperatures between about 120° and about 180° C., on a liquefied phenol free from alkali-sensitive groups in the presence of an alkali metal phenolate.

16. In the catalytic production of vinyl ethers from non-explosive mixtures of hydrocarbons of the acetylene series and alcohols, the step which comprises acting with a mixture of acetylene and an inert gaseous diluent at superatmospheric pressure and at a temperature between about 80° and about 250° C. in a strongly alkaline medium on a liquefied organic, monomeric hydroxy compound, free from alkali-sensitive groups and corresponding to the formula $$R\diagup^{X}_{OH},$$

in which X represents either —H, —COOH, —COO—metal, —NY$_2$, —(OR)$_n$—OH or —(OR)$_n$—OR groups, R being an aliphatic, hydroaromatic, aromatic or aralkyl radicle, Y being —H, —R or ROH and n being nought or any integral number.

17. As new articles of manufacture, vinyl ethers corresponding to the general formula CH$_2$=CH—O—R, in which R is an aliphatic radicle containing at least 5 carbon atoms.

18. As new articles of manufacture vinyl ethers corresponding to the general formula CH$_2$=CH—O—R, in which R is an aliphatic radicle containing an amino group.

19. As new articles of manufacture vinyl ethers corresponding to the general formula CH$_2$=CH—O—R, in which —O—R is a radicle of a glycol.

20. As new articles of manufacture vinyl ethers corresponding to the general formula CH$_2$=CH—O—R, in which —O—R is a radicle of a poly-alkylene glycol.

21. As new articles of manufacture vinyl ethers corresponding to the general formula CH$_2$=CH—O—R—O—CH=CH$_2$ in which —O—R—O— is a radicle of a glycol.

22. As new articles of manufacture vinyl ethers corresponding to the general formula CH$_2$=CH—O—R, in which O—R is a radicle of a poly-ethylene glycol.

23. As new articles of manufacture vinyl ethers corresponding to the general formula CH$_2$=CH—O—R, in which O—R is a radicle of a di- or tri-ethylene glycol.

WALTER REPPE.

CERTIFICATE OF CORRECTION.

Patent No. 1,959,927.                                        May 22, 1934.

WALTER REPPE.

It is hereby certified that error appears in the printed specification of the above numbered patent requiring correction as follows: Page 2, line 141, for "atuoclave" read autoclave; and line 143, strike out the words "butanol until the pressure is about 15 atmos-" and insert the same after line 140; page 5, line 108, claim 4, for "nonomeric" read monomeric; and that the said Letters Patent should be read with these corrections therein that the same may conform to the record of the case in the Patent Office.

Signed and sealed this 11th day of September, A. D. 1934.

Leslie Frazer (Seal)                                        Acting Commissioner of Patents.